Figure 1:
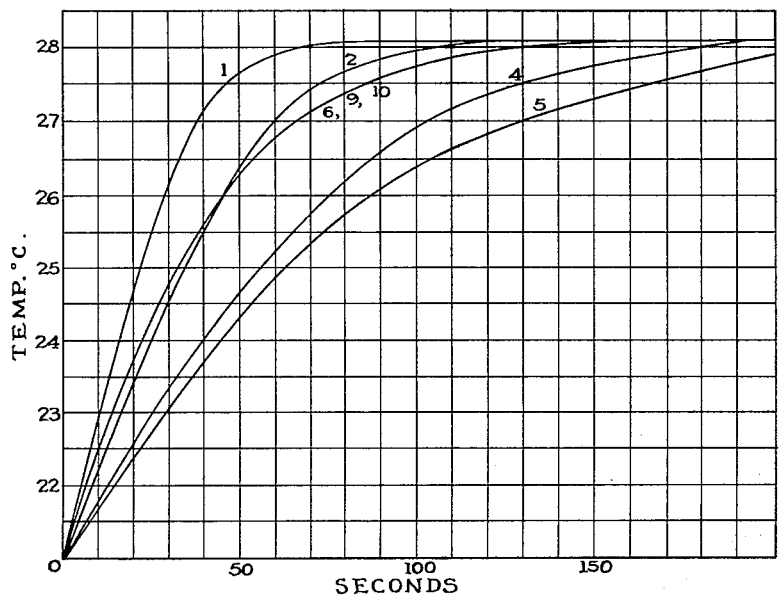

Aug. 3, 1965   A. C. EIDE   3,198,646
ZINC OXIDE BLENDS AND PROCESSES FOR PRODUCING ZINC PIGMENTS
Filed May 28, 1962

INVENTOR
ALWIN C. EIDE
BY Cameron, Kerkam & Sutton
ATTORNEYS

United States Patent Office 3,198,646
Patented Aug. 3, 1965

3,198,646
ZINC OXIDE BLENDS AND PROCESSES FOR
PRODUCING ZINC PIGMENTS
Alwin C. Eide, Columbus, Ohio, assignor to American
Zinc, Lead and Smelting Company, St. Louis, Mo., a
corporation of Maine
Filed May 28, 1962, Ser. No. 198,277
5 Claims. (Cl. 106—292)

This invention relates to zinc oxide blends and to processes for production of zinc pigments and more particularly to zinc oxide blends and processes for the manufacture of zinc chromate pigment and other zinc compounds wherein zinc oxide is reacted with a chemical reagent to produce zinc chromate or other zinc compound, the physical properties of the final product being in large part determined by the physical properties of the starting zinc oxide.

The zinc oxides of commerce are all much alike chemically, consisting of from 98.5 to 99.9% zinc oxide and are very free of chemical impurities. However, commercial zinc oxides have wide differences in physical properties, especialy particle shape, particle size and the distribution of shapes and sizes. No two types of zinc oxide are identical in this respect. For example, American Process Zinc Oxide, produced directly from zinc concentrates, may be composed of particles of two crystal habits, the round or nodular particle, and the acicular or needle shaped particle. These particles range in size from an average of 0.2 micron to 0.8 micron.

The particle size distribution band of any one type or brand of zinc oxide is relatively narrow. For example, 50% of a product having an average specific surface diameter of 0.25 micron falls between 0.22 and 0.28 micron, and 50% of one having an average specific surface diameter of 0.45 micron would probably fall between .40 and 0.50 micron.

Similarly, French Process Zinc Oxide, produced indirectly from zinc metal, is produced with particles of a nodular crystal habit ranging in size from 0.1 to 0.35 micron.

In many cases, important physical properties of a product made from zinc oxide are determined by the particle size and particle size distribution of the zinc oxide although the zinc oxide is completely consumed in the reaction. This is particularly true in the manufacture of pigment zinc chromate and this invention relates particularly to the manufacture of zinc chromate having a very superior color strength and a light and clean masstone.

It is therefore an object of the present invention to provide novel zinc oxide blends and processes for producing zinc chromate pigments having superior color strength and a light and clean masstone.

Another object of the present invention is to provide such zinc oxide blends and processes for producing zinc compounds particularly zinc chromate which pigment zinc chromate has a superior color strength and a light and clean masstone.

The zinc oxide blends and processes of the present concept are capable of various modifications both in composition and in procedural steps within the scope of the inventive concept. Illustrative blends and procedures will be discussed herein in explanation of the present invention but should not be construed as limiting the scope of the same.

Figure 2:
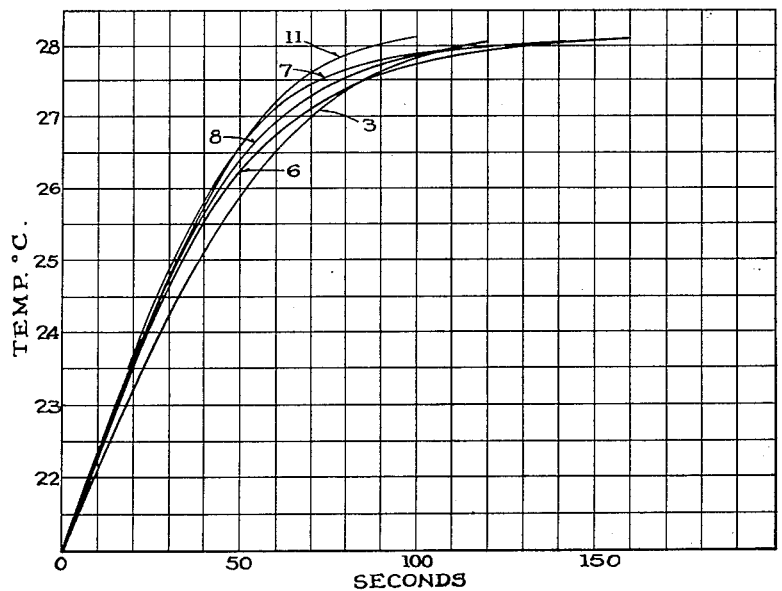

The accompanying drawings illustrate various time-temperature curves for various zinc oxides and zinc oxide blends discussed hereinafter with FIG. 1 of the drawing showing such time-temperature curves for zinc oxides and zinc oxide blends identified in Table I hereafter as Items 1, 2, 4, 5, 6, 9 and 10 while FIG. 2 shows time-temperature curves for Items 3, 6, 7, 8 and 11 of Table I.

As illustrative of the present concept, processes for the production of zinc chromate will now be considered but it is to be understood that the present invention is equally applicable to other zinc pigments and zinc compounds.

The following process is used to develop a satisfactory zinc oxide for use in zinc chromate production and as a standard for acceptable zinc oxide for conversion to zinc chromate:

| Components | Process |
|---|---|
| 300 cc. Water, 5 gms. Caustic. | Dissolve caustic in a 1,500 cc. beaker with 300 gms. of water (300 cc.). |
| 70 gms. Zinc Oxide | Add dry Zinc Oxide to water. Stir overnight to permit maximum "swelling" of the zinc oxide. |
| 40 gms. 66 Bé. Sulfuric Acid. | Cool and dilute by running acid to ice and water—temperature held under 60° F. Run acid to slurrying zinc oxide in 10 minutes—use extra ice to hold the temperature of the zinc oxide slurry under 60° F. Allow zinc oxide and acid to stir a minimum of 5 hours before adding dichromate. |
| 95 gms. Potassium Dichromate. | Add dry to zinc oxide and acid. Let stir overnight for fullest utilization of chromate excess. Let settle for 24 hours. When all the pigment is firmly settled at the bottom of the jar or tank—decant the excess chromate liquor. Wash pigment several times allowing time for pigment to settle—approximately one hour between decantations. Filter—form a presscake at least one inch thick—dry at 140° F. Weigh pigment residue and check on yield and quality comparing with a standard made at the same time as the series. Average yield return of 144–146 gms. |

The dried zinc chromate is tested for tinting strength using the procedure recommended by ASTM D–387–52T.

I have found, most unexpectedly, that, if a number of zinc oxides having different particle size characteristics are blended prior to use, the tinting strength and masstone of the resulting zinc pigment is superior to that made from the individual components of the blend.

The tinting strength, masstone, bulk density and recovery of zinc chromate pigments are largely determined by the rate of reaction between the zinc oxide particles in suspension in the slurry and the solid (or partially dissolved) dichromate salt in the pulp. There are two distinct phases or periods in this reaction. In the first period nuclei form and the number of discrete individual particles is established. In the second phase these nuclei (colloidal in size at the beginning) are built up to optimum size for maximum tinting strength. Obviously, there is no sharp line of demarcation between these two phases, but a gradual transition occurs from the time when all the reaction product makes new particles to the time when no new particles are made and all the reaction product plates out or is deposited on the nuclei which continue to grow in size until the reactants are all consumed.

If a zinc oxide is used having too fine particle size it will have a very rapid reaction rate. Too many nuclei are formed with not enough zinc oxide remaining to build up these nuclei to optimum particle size. The resulting product has low tinting strength and low bulk density. On the other hand, if a zinc oxide is used that is too coarse in particle size, too few nuclei are produced and the ultimate particle size is greater than optimum with low tinting strength and high bulk density.

The several examples of Table I, numbered 1–11, illustrate these discoveries. In Table I the particle size characteristics of eleven different zinc oxides and blends of zinc oxides are tabulated with the corresponding tinting strengths and masstones of the zinc chromate pigments made from these zinc oxides. The specific surface diameters of the zinc oxides and blends are also shown.

Table I

| No. | Type of Oxide | Masstone | Tinting Strength | Specific Surface Diameter in Microns | Specific Surface Area, Sq. M/Gram |
|---|---|---|---|---|---|
| 1 | French Process (nodular) | Very slight red | 92 | .165 | 6.62 |
| 2 | do | Standard | 100 | .248 | 4.25 |
| 3 | do | Very very slight red and very slight clean | | .276 | 3.88 |
| 4 | do | Very very slight red and very very slight clean | 92 | .406 | 2.78 |
| 5 | American Process (acicular with appreciable water soluble content) | Light, clean and very very slight red | 110 | .40 | 2.71 |
| 6 | Blend of Nos. 1, 2, 5 | Light and clean | 124 | .22 | 4.91 |
| 7 | Blend of Nos. 1, 2, 3 | Very slight dark, very very slight red | (95) | .226 | 4.73 |
| 8 | Blend of Nos. 1, 2, 4 | Very very slight red | 91 | .219 | 4.93 |
| 9 | Blend, repeat of No. 6 | Light and clean | 124 | .23 | 4.80 |
| 10 | Blend of Nos. 1, 2, 5 | do | 120 | .225 | 4.80 |
| 11 | French Process (nodular) | | | .240 | 4.45 |

Of the individual zinc oxides tested, an acicular American Process Zinc Oxide having a water soluble sulfur content of between .05% and .30% gives better tinting strength than a French Process Oxide of similar specific surface diameter. (Compare Nos. 4 and 5, Table I.) This is caused by the small percentage of soluble zinc reacting rapidly at the beginning of the reaction and producing nuclei. The acicular character of the crystals also has some effect on the speed of reaction in the second phase of the reaction (compare Nos. 8 and 10, Table I).

In this application the terms "water soluble sulfur" and "water soluble zinc" refer to the same impurity found in small quantities in all American Process Zinc Oxides and usually reported as "soluble sulfur."

However, the relatively coarse acicular zinc oxides alone do not produce a superior product unless some French Process Zinc Oxide is added to provide the necessary abundance of starting nuclei.

I have discovered that if a blend of equal parts of Nos. 1, 2 and 5 (Table I) is made that the average particle size remains substantially the same as No. 2 (Table I), but that the distribution band widens materially providing, not only the high initial activity required to develop the optimum number of zinc chromate nuclei, but also ample zinc oxide to develop these nuclei to optimum size for providing maximum tinting strength. I believe that a small quantity of water soluble zinc should be present. This is supplied by the American Process Zinc Oxide which has an appreciable water soluble content.

The chemical reactions described above are complex. Unknown side reactions occur which make it impossible to control the development of nuclei and the subsequent development to optimum particle size by adding zinc oxide during the reaction to control the reaction time and thereby obtain maximum tinting strength. I have found that only a proper starting blend of zinc oxides can assure maximum tinting strength and acceptable masstone in the resulting zinc pigment.

A suitable starting blend consists of equal parts of an American Process Acicular Zinc Oxide having a specific surface diameter (see ASTM-D1366-55T) of .35-.40 micron; a French Process Zinc Oxide having a specific surface diameter of .23-.28 micron; and a French Process Zinc Oxide having a specific surface diameter of .12-.20 micron. Such a blend will have a specific surface diameter of approximately .22 micron.

I have discovered further, that particle shape in the starting blend also is important and a substantial percent of acicular zinc oxide particles are necessary. Therefore, one third of the blend is an American Process Zinc Oxide such as No. 5 (Table I).

Since the zinc oxides of commerce have such a wide variety of particles sizes and relatively narrow particle size distribution bands, it is expensive and time consuming to select a single oxide that will produce superior results in a zinc pigment. A reactivity test is unnecessary to aid in the selection or the preparation of a suitable blend of zinc oxides. Any test method that provides a time-temperature curve of the zinc oxide reaction or any test method that provides a particle size distribution curve may be used. Since reaction rate is the determining factor, time-temperature data is preferred to particle size data.

Apparatus is available for determining the reactivity of zinc oxide when a known weight of zinc oxide is reacted with an excess of tartaric acid in a calorimeter. The heat of reaction is recorded on a time-temperature curve. Since the present invention involves the reaction rates of zinc oxides, the length and shape of these time-temperature curves illustrate the effect of blending of zinc oxides as disclosed herein.

FIGURES 1 and 2 of the drawings are graphs showing the time-temperature curves of all the zinc oxides and blends of Table I with time plotted as the abscissa and temperature as the ordinate. The initial slope of curves No. 11 and No. 6 are identical because the specific surfaces of the two zinc oxides are the same, but curve No. 11 rises sharply and terminates at 100 seconds. See FIG. 2. The blend of curve No. 6, after the sharp initial rise, rises slowly and extends to 160 seconds, indicating that zinc oxide is present to react for a much longer time. Curves Nos. 4 and 5, on the other hand, show a longer reaction than the zinc oxide blend but the initial slope is slow, indicating that the initial reactivity will not produce the abundance of nuclei necessary to produce maximum tinting strength.

It will now be appreciated that the present invention in every way satisfies the several objectives discussed above.

Changes in or modifications to the above described illustrative procedures and examples may now be suggested to those skilled in the art without departing from the present inventive concept. Reference should therefore be had to the appended claims to determine the scope of this invention.

What is claimed is:

1. A zinc oxide blend for use in the manufacture of zinc chromate pigment which consists of equal parts of a French Process Zinc Oxide having a specific surface of approximately 6.62 square meters per gram, a French Process Zinc Oxide having a specific surface of approximately 4.25 square meters per gram and an acicular American Process Zinc Oxide with a specific surface of approximately 2.71 square meters per gram.

2. In a process for producing a zinc chromate pigment, the steps of forming a water slurry of equal parts of two nodular zinc oxides having specific surfaces, respectively, of approximately 6.62 and 4.25 square meters per gram and an acicular zinc oxide having a specific surface of 2.71 square meters per gram, stirring the slurry for not less than one hour, then adding sulfuric acid and potassium dichromate to the slurry with continued stirring, then decanting excess chromate liquor and then washing and filtering the resulting zinc chromate.

3. In a process for producing a zinc oxide for production of zinc chromate compounds the quality of which is determined by the physical properties of the zinc oxide, the step of blending in equal parts a French Process Zinc Oxide of high specific surfaces of approximately 6.62 square meters per gram, a French Process Zinc Oxide of a medium specific surface of approximately 4.25 square meters per gram and an acicular American Process Zinc Oxide of low specific surface of approximately 2.71 square meters per gram.

4. In a process for producing a zinc chromate pigment, the steps of forming a water slurry of equal parts of two French Process Zinc Oxides and an American Process Zinc Oxide having specific surface diameters in microns of approximately .165, .248 and .40, respectively, the French Process Zinc Oxides having nodular particles and the American Process Zinc Oxide having acicular particles and containing appreciable water soluble zinc compounds, stirring the slurry for not less than one hour, then adding sulfuric acid and potassium dichromate to the slurry with continuous stirring, then decanting excess chromate liquor and then washing and filtering the resulting zinc chromate.

5. A zinc oxide blend for use in the manufacture of zinc chromate pigment which consists of equal parts of a nodular French Process Zinc Oxide having a specific surface diameter of approximately .165 micron, a nodular French Process Zinc Oxide having a specific surface diameter of approximately .248 microns and an acicular American Process Zinc Oxide having a specific surface diameter of approximately .40 micron and containing appreciable water soluble zinc compounds.

References Cited by the Examiner

Behr: Zinc Chromate Pigments, Paint Manufacturer, August 141, pages 157–161.

Kekwick et al.: Acicular Zinc Oxide, Paint Manufacture, January 1938, pages 22 and 23.

TOBIAS E. LEVOW, *Primary Examiner.*